(12) United States Patent
Hampton

(10) Patent No.: US 11,740,934 B2
(45) Date of Patent: *Aug. 29, 2023

(54) SYSTEMS AND METHODS FOR THREAD MANAGEMENT TO OPTIMIZE RESOURCE UTILIZATION IN A DISTRIBUTED COMPUTING ENVIRONMENT

(71) Applicant: SailPoint Technologies, Inc., Wilmington, DE (US)

(72) Inventor: Adam Ethan Hampton, Houston, TX (US)

(73) Assignee: SailPoint Technologies, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/489,539

(22) Filed: Sep. 29, 2021

(65) Prior Publication Data

US 2022/0229694 A1 Jul. 21, 2022

Related U.S. Application Data

(63) Continuation of application No. 17/153,970, filed on Jan. 21, 2021, now Pat. No. 11,163,606.

(51) Int. Cl.
*G06F 9/48* (2006.01)
*H04L 67/10* (2022.01)
*G06F 9/50* (2006.01)

(52) U.S. Cl.
CPC ............ *G06F 9/4881* (2013.01); *G06F 9/505* (2013.01); *H04L 67/10* (2013.01); *G06F 2209/5018* (2013.01)

(58) Field of Classification Search
CPC .................. G06F 9/4881; G06F 9/505; G06F 2209/5018; H04L 67/10
See application file for complete search history.

(56) References Cited

U.S. PATENT DOCUMENTS

2019/0102384 A1\* 4/2019 Hung .................. G06F 9/45558
2020/0348968 A1\* 11/2020 Huchachar ............. G06F 9/445

\* cited by examiner

*Primary Examiner* — Wissam Rashid
(74) *Attorney, Agent, or Firm* — Sprinkle IP Law Group

(57) ABSTRACT

Systems and methods for embodiments for load attenuating thread pools (LATP) that may be associated with a service deployed in distributed computer environment, where that service utilizes a shared resource. A LATP includes a thread pool comprising a number of worker threads servicing requests handled by a service that includes such a LATP. The thread pool is managed by a thread pool manager of the LATP that can attenuate (herein used to mean add, remove or leave unchanged) the number of worker threads in the thread pool based on a resource utilization metric associated with the shared resource.

21 Claims, 5 Drawing Sheets

SYSTEMS AND METHODS FOR THREAD MANAGEMENT TO OPTIMIZE RESOURCE UTILIZATION IN A DISTRIBUTED COMPUTING ENVIRONMENT

RELATED APPLICATION(S)

This application is a continuation of, and claims a benefit of priority under 35 U.S.C. 120 of, U.S. patent application Ser. No. 17/153,970 filed Jan. 21, 2021, issued as U.S. Pat. No. 11,163,606, entitled "SYSTEMS AND METHODS FOR THREAD MANAGEMENT TO OPTIMIZE RESOURCE UTILIZATION IN A DISTRIBUTED COMPUTING ENVIRONMENT," which is hereby incorporated herein for all purposes.

TECHNICAL FIELD

This disclosure relates generally to management of resources utilization in computing systems. In particular, embodiments of this disclosure relate to optimizing utilization of resources in a distributed computing environment through thread management. Even more specifically, embodiments of this disclosure relate to the management of resource utilization of a shared resource thorough workload attenuation based on a resource utilization metric.

BACKGROUND

In distributed and networked computing systems resource contention has become an increasingly prevalent issue. Specifically, distributed computing processes may utilize available resources in the computing environment. In certain cases, the resource is provided on a computing system or platform (used interchangeably) distinct from the computing system on which the process is executing. The computing process thus accesses the desired resource over a computing network. Because of the distributed nature of such computing environments the accessing computing process may access the resource without regard for (or knowledge of) other processes in the distributed environment that are also utilizing the resource.

These accessed resources may, however, be finite resources limited by a number of variables including software or hardware limitations associated with the resource such as available TCP sockets, processor availability or capabilities, or memory or other storage availability, among others. Thus, contention for these shared resources resulting from the use of these resources by processes in a distributed computing processes may result in a degradation of the performance of the resource and, in turn, the degradation of the performance of the accessing processes themselves, as these processes may depend on the operation of these resources.

These problems are exacerbated by the architectures of a number of current implementations of these distributed networked computer systems. Many times, the services of a software platform (e.g., sometimes referred to as web services) are provided in the context of cloud computing. A cloud computing based service or resource generally refers to a service or resource that allows requesters (e.g., clients such as other services or systems) to access operations provided by the service through one or more requests sent over a network (the Internet, for example) using an interface (e.g., a Representational State Transfer, or RESTful, interface or the like) provided by the service. In this manner, a service may, as examples, provide Software as a Service (SaaS) by hosting applications; Infrastructure as a Service (IaaS) by hosting equipment (servers, storage components, network components, etc.); or a Platform as a Service (PaaS) by hosting a computing platform (operating system, databases, hardware, storage, etc.). These services are generally referred to by the umbrella term SaaS.

Many software providers have taken advantage of these new delivery models to implement their software solutions or applications (referred to as their software platform or solution) as a set of these services and to utilize services provided by cloud computing providers. Typically, the set of services providing the software platform are deployed in a cloud computing environment, as discussed. Cloud computing resources are usually housed in large server farms that run these services, in many cases using a virtualized architecture wherein the service runs inside virtual servers, or so-called "virtual machines" (VMs) or "containers", that are mapped onto physical servers in a data center facility. Many providers of cloud computing platforms that offer such cloud based resources currently exist, such as Amazon Web Services (AWS), Google Cloud Platform, Microsoft Azure, etc. Thus, in many cases software providers, such as enterprises or the like, may deploy their software platform as a set of services on, or their software platform may utilize resources provided by, a third-party cloud computing platform such as AWS, alleviating the need for such enterprises to provide the hardware infrastructure for running or implementing such services or resources.

The use of such SaaS has resulted in a proliferation of services. In fact, many implementations of computing platforms have begun to utilize microservice architectures. These architectures may employ microservices (which will be understood to come in under the term services more generally) which are generally numerous smaller, more specific services, where multiple instances of a particular microservice may exist. Typically, these instances of a particular microservice may be dynamically variable such that instances of a microservice may be created or deprecated as needed in a computing platform. Moreover, the implementation of multi-tenancy in such computing platforms has further increased the number and variability of such services in many modern computing platforms.

While having many advantages then, the architectures of many modern distributed networked computing platforms including an increased prevalence of services and resources and increasing separation and distribution of such services and resources has served to aggravate the resource contention problem. Namely, there is a high likelihood that these numerous distributed services will contend for a limited shared resource, resulting in performance degradation that, in turn, may negatively affect the performance of the services utilizing the resource and, ultimately, may result in a negative user experience for users (e.g., human or machine) of such services.

What is desired then, is a process control mechanism that may serve to mitigate the effects of resource contention.

SUMMARY

As mentioned, the architectures of many modern distributed networked computing platforms including an increased prevalence of services and resources and increasing separation and distribution of such services and resources has served to aggravate the resource contention problem. Namely, there is a high likelihood that these numerous distributed services will contend for a limited shared resource, resulting in performance degradation that, in turn, may negatively affect the performance of the services utilizing the resource and, ultimately, may result in a negative user experience for users (e.g., human or machine) of such services.

It may be useful to illustrate certain examples of such resource contention and its detrimental effects. As but one example, many SaaS environments are set up as a set of services deployed to implement a computing platform. These services may share the use of cloud deployed resources such as a relational database or the like (e.g., AWS Relational Database Service (RDS) or the like). Some of these services may be adapted to handle user requests for functionality of the computing platform, such as requests coming in through a client or web based interface to the computing platform. Thus, these services may be expected to respond to such requests in real-time and to avoid timing out or the like. Accordingly, response time of those services to those requests may be important as it affects response times of those services to user requests and thus the user experience.

In contrast, some of the services of the computing platform may be adapted to service "batch" (or other) requests (collectively referred to as batch requests) that may be, for example, internal to the computing platform or otherwise involved with the operation of the platform and which may require the processing of large amounts of data. Often time such requests are services in the background of the processing of such computing platforms. These batch requests may include requests associated with the collection or transformation of data such as extract, transform and load (ETL) processing from source systems or the like. Thus, while there is no real-time requirement for the processing of such requests, the services that are adapted to process these batch request may nonetheless contend for the same cloud deployed resources (e.g., storage such as relational data systems) as the other services of the computing platform, including those that have real-time response requirements such as those that service user requests. In other words, these shared resources may simultaneously be utilized in the servicing of user interface requests and (e.g., queued, background) batch tasks.

Many of these types of shared resource (e.g., relational database software engines) do not horizontally scale or do not scale efficiently or on demand, and cannot vertically scale without software downtime that negatively impacts service availability. When these shared resources become saturated or overloaded with processing requests the user experience can thus degrade as it affects the services of the computing platform servicing these requests. Such degradation can happen when the interface to the shared resource (e.g., relational database system) perceptibly slows down or outright fails due to timing out. Computing platforms that place no controls on utilization of these shared resources may thus be exposed to outages or poor performance due to saturation or overload of those shared resources. These outages or degradations may occur, for example, during times when large queues of batch work are queued to be processed and when high volumes of user driven traffic demands timely responses from these shared resource. These problems are pronounced in multi-tenant SaaS computing platforms where one tenant can cause a large (e.g., batch) task to be performed, where the performance of this task negatively impacts the performance of the computing platform for other tenants. This type of performance degradation is colloquially known as the "noisy neighbor" problem.

Simple solutions to these problems place a fixed limit of how much load the queued batch jobs may place on the shared resource. This fixed limit is usually manually configured. Such solutions are not dynamic then; they simply restrict batch job throughput down to a level that is heuristically shown to not negatively impact the user experience. Implementations of these systems may thus simply reduce the number of service instances or requests that can concurrently connect to the shared resource, or they may institute semaphores or other gating limits that prevent too many sources of load from transacting with the shared resource concurrently. These fixed systems require manual tuning and importantly leave a lot of available compute capacity unused and idle during periods of lower demand from servicing user interface requests.

Accordingly, an effective control mechanism is desired in distributed computing platforms to prevent outages or service degradation in these platforms due to increased processing latency of shared resources. It is also desirable that such a control mechanism mitigate the risk of "noisy neighbor" problems, where different tenants' batch jobs or user interface load cause perceptible degradation for other users.

To those ends, among others, embodiments as disclosed herein provide systems and methods for load attenuating thread pools (LATP) that may be associated with a service deployed in distributed computer environment, where that service utilizes a shared resource. A LATP includes a thread pool comprising a number of worker threads servicing requests handled by a service that includes such a LATP. The thread pool is managed by a thread pool manager of the LATP that can attenuate (herein used to mean add, remove or leave unchanged) the number of worker threads in the thread pool based on a resource utilization metric associated with the shared resource. In particular, at some time interval a resource utilization metric associated with the shared resource may be obtained and evaluated using a thread policy. This resource utilization metric may be an I/O metric, a network metric or a CPU utilization metric or the like that is offered by the provider of the shared resource and accessible through an interface associated with the provider of the shared resource. Depending on the results of the evaluation of the resource utilization metric, threads may be added to the thread pool, threads of the pool may be removed (e.g., killed or made idle) or the number of threads may be unchanged.

Such LATPs may be useful when used with multiple autonomous services that are accessing a shared resources where there is little to no ability to determine concurrency or threading of these other services, or of controlling the processing or implementation of these remotely shared resources, such as when the shared resource is a remote shared resource offered by a cloud service provider or the like. Thus, the resource utilization metrics can serve a proxy for the load of the shared resource across the distributed computing environment, allowing services within that environment to tailor their own usage of the shared resource to ensure that headroom or availability of that shared resource to handle higher priority or particular types of requests from within that distributed computing environment.

As such, embodiments may be especially useful when deployed to manage the utilization of a shared resource in a distributed computing environment that has (batch) services for batch (e.g., background or lower priority) work items and higher priority items such as user requests. A load attenuating thread pool may be utilized with each of the batch services for processing batch work items such that each of the batch services includes a LATP. Each LATP associated with a batch service may operate independently to manage the thread pool for that particular service based on the resource utilization metric associated with the shared resource. Thus, there may be no coordination between the LATPs of each batch service or the batch services (e.g., LATP thread managers may not communicate or have any awareness of other LATP thread managers or even of other services) in managing their respective thread pools. Based on the resource utilization metric associated with the shared resource, each LATP manager determines (e.g., independently) whether to add more worker threads to processing batch requests for that batch service instance, leave the number of thread unchanged, or to remove (e.g., kill or idle) the number of threads for that batch service instance. As LATP thread managers may be adapted not to operate in synchronicity (e.g., accessing the resource utilization metric or making attenuation determinations at the same time or operating according to the same time interval, etc.) the thread adjustments for the thread pool for each service may be distributed across the time interval or intervals utilized by such LATP thread manager and may occur at different times. Accordingly, LATP thread managers may be thought of as acting autonomously for a cooperative shared goal of optimizing shared resource utilization (e.g., such that higher priority requests from other services may be processed by the shared resource in a timely manner).

In one embodiment, a distributed computing system can include a set of first lower priority services, each lower priority service comprising a load attenuated thread pool comprising a thread pool manager and a thread pool comprising a set of threads, where each thread of the thread pool utilizes a shared resource deployed at a computing platform accessible over a computing network by the lower priority service. The distributed computing system also includes a set of higher priority services, each higher priority service adapted to process work items utilizing the shared resource. These higher priority services may, for example, be associated with user interface requests of the distributed computing system.

In this embodiment, each thread pool manager of each service is independently adapted to, at a time interval: determine a resource utilization metric associated with the shared resource and evaluate the resource utilization metric associated with the shared resource against a policy defining a capacity full threshold and a capacity available threshold to determine if the resource utilization metric falls into a capacity exceeded zone, a capacity full zone or a capacity available zone. When the resource utilization metric falls into a capacity exceeded zone, a removal thread number is determined and that removal thread number of threads removed from an existing number of the set of threads of the thread pool. When the resource utilization metric falls into a capacity available zone a thread addition number is determined and that thread addition number of threads is added to the existing number of the set of threads of the thread pool. When the resource utilization metric falls into a capacity full zone the set of threads is left unchanged.

In some embodiments, determining the removal thread number comprises applying a back-off ratio defined in the policy to the existing number of the set of threads or a maximum number of threads as defined in the policy.

In particular embodiments, the resource utilization metric is a hardware or network utilization metric associated with a total load placed on the shared resource, such as the CPU utilization of the computing platform on which the shared resource is deployed. This computing platform may be, for example, a (e.g., third party) cloud based computing platform.

Specific embodiments may include thread manager updater adapted to access the shared resource, obtain the resource utilization metric, and store the resource utilization metric at a storage location, wherein each thread pool manager accesses the resource utilization metric at the storage location.

Embodiments thus provide numerous advantages over previously available systems and methods for managing resource utilization. In particular, embodiments that employ the LATP approach to shared resource management may improve response times for high priority requests that it is desired to respond to in real-time or near real-time (collectively real-time) avoiding time out issues and improving usability and user experiences with distributed computing platforms. More specifically, the LATP approach of embodiments allows a granular attenuation of load, including down to individual worker thread counts. Embodiments utilizing the LATP approach allow potentially faster feedback loop iteration, limited only by the frequency of updates from the resource utilization metric by the provider of the shared resource. The LATP approach has other advantages: attenuating threads in a pool is faster and more granular than attenuating the number of running containers. Moreover, the LATP approach provides a smoother decision process for electing when to vertically up-scale portions of other infrastructure. With LATP as employed in embodiments outages of infrastructure to address resource contention issues (e.g., to increase the compute resources available to shared resources) may no longer be required.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
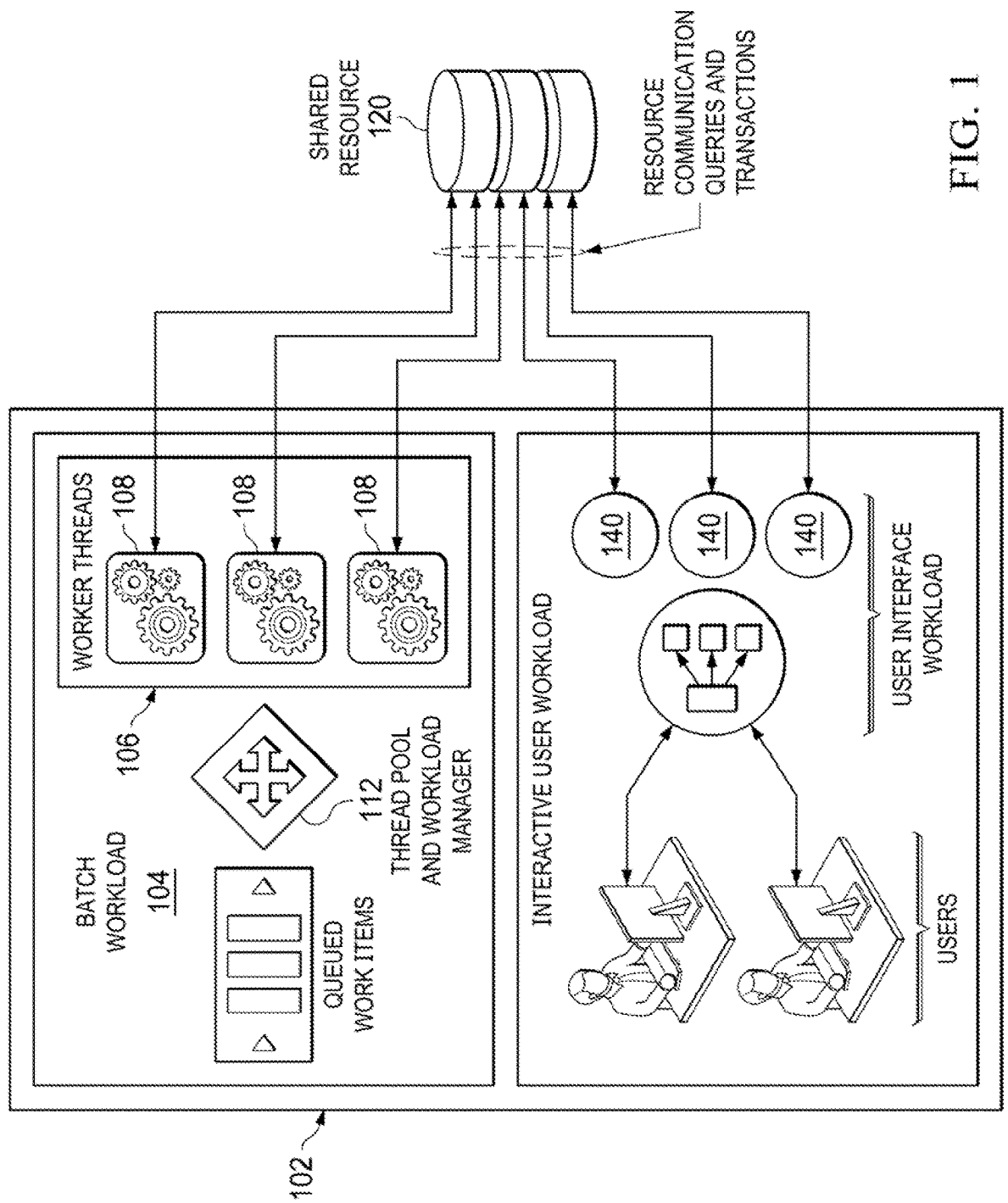
FIG. 1 is a block diagram of a distributed networked computer environment including one embodiment of a load attenuated thread pool.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. As discussed above the architectures of many modern distributed networked computing platforms include an increased prevalence of services and resources and increasing separation and distribution of such services and resources has served to aggravate the resource contention problem. Namely, there is a high likelihood that these numerous distributed services will contend for a limited shared resource, resulting in performance degradation that, in turn, may negatively affect the performance of the services utilizing the resource and, ultimately, may result in a negative user experience for users (e.g., human or machine) of such services.

It may be useful to illustrate certain examples of such resource contention and its detrimental effects. As but one example, many SaaS environments are set up as a set of services deployed to implement a computing platform. These services may share the use of cloud deployed resources such as a relational database or the like (e.g., AWS Relational Database System (RDS) or the like). Some of these services may be adapted to handle user requests for functionality of the computing platform, such as requests coming in through a client or web based interface to the computing platform. Thus, these services may be expected to respond to such requests in real-time and to avoid timing out or the like. Accordingly, response time of those services to those requests may be important as it affects response times of those services to user requests and thus the user experience.

In contrast, some of the services of the computing platform may be adapted to service "batch" (or other) requests (collectively referred to as batch requests) that may be, for example, internal to the computing platform or otherwise involved with the operation of the platform and which may require the processing of large amounts of data. Often time such requests are services in the background of the processing of such computing platforms. These batch requests may include requests associated with the collection or transformation of data such as extract, transform and load (ETL) processing from source systems or the like. Thus, while there is no real-time requirement for the processing of such requests, the services that are adapted to process these batch request may nonetheless contend for the same cloud deployed resources (e.g., storage such as relational data systems) as the other services of the computing platform, including those that have real-time response requirements such as those that service user requests. In other words, these shared resources may simultaneously be utilized in the servicing of user interface requests and (e.g., queued, background) batch tasks.

Many of these types of shared resource (e.g., relational database software engines) do not horizontally scale or do not scale efficiently or on demand, and cannot vertically scale without software downtime that negatively impacts service availability. When these shared resources become saturated or overloaded with processing requests the user experience can thus degrade as it affects the services of the computing platform servicing these requests. Such degradation can happen when the interface to the shared resource (e.g., relational database system) perceptibly slows down or outright fails due to timing out. Computing platforms that place no controls on utilization of these shared resources may thus be exposed to outages or poor performance due to saturation or overload of those shared resources. These outages or degradations may occur, for example, during times when large queues of batch work are queued to be processed and when high volumes of user driven traffic demands timely responses from these shared resource. These problems are pronounced in multi-tenant SaaS computing platforms where one tenant can cause a large (e.g., batch) task to be performed, where the performance of this task negatively impacts the performance of the computing platform for other tenants. This type of performance degradation is colloquially known as the "noisy neighbor" problem.

Accordingly, an effective control mechanism is desired in distributed computing platforms to prevent outages or service degradation in these platforms due to increased processing latency of shared resources. It is also desirable that such a control mechanism mitigate the risk of "noisy neighbor" problems, where different tenants' batch jobs or user interface load cause perceptible degradation for other users.

To those ends, among others, embodiments as disclosed herein provide systems and methods for load attenuating thread pools (LATP) that may be associated with a service deployed in distributed computer environment, where that service utilizes a shared resource. A LATP includes a thread pool comprising a number of worker threads servicing requests handled by a service that includes such a LATP. The thread pool is managed by a thread pool manager of the LATP that can attenuate (herein used to mean add, remove or leave unchanged) the number of worker threads in the thread pool based on a resource utilization metric associated with the shared resource. In particular, at some time interval a resource utilization metric associated with the shared resource may be obtained and evaluated using a thread policy. This resource utilization metric may be a I/O metric, a network metric or a CPU utilization metric or the like that is offered by the provider of the shared resource and accessible through an interface associated with the provider of the shared resource. Depending on the results of the evaluation of the resource utilization metric, threads may be added to the thread pool, threads of the pool may be removed (e.g., killed or made idle) or the number of threads may be unchanged.

Such LATPs may be useful when used with multiple autonomous services that are accessing a shared resources where there is little to no ability to determine concurrency or threading of these other services, or of controlling the processing or implementation of these remotely shared resources, such as when the shared resource is a remote shared resource offered by a cloud service provider or the like. Thus, the resource utilization metrics can serve a proxy for the load of the shared resource across the distributed computing environment, allowing services within that environment to tailor their own usage of the shared resource to ensure that headroom or availability of that shared resource to handle higher priority or particular types of requests from within that distributed computing environment.

As such, embodiments may be especially useful when deployed to manage the utilization of a shared resource in a distributed computing environment that has (batch) services for batch (e.g., background or lower priority) work items and higher priority items such as user requests. A load attenuating thread pool may be utilized with each of the batch services for processing batch work items such that each of the batch services includes a LATP. Each LATP associated with a batch service may operate independently to manage the thread pool for that particular service based on the resource utilization metric associated with the shared resource. Thus, there may be no coordination between the LATPs of each batch service or the batch services (e.g., LATP thread managers may not communicate or have any awareness of other LATP thread managers or even of other services) in managing their respective thread pools.

Based on the resource utilization metric associated with the shared resource, each LATP manager determines (e.g., independently) whether to add more worker threads to processing batch requests for that batch service instance, leave the number of thread unchanged, or to remove (e.g., kill or idle) the number of threads for that batch service instance. As LATP thread managers may be adapted not to operate in synchronicity (e.g., accessing the resource utilization metric or making attenuation determinations at the same time or operating according to the same time interval, etc.) the thread adjustments for the thread pool for each service may be distributed across the time interval or intervals utilized by such LATP thread manager and may occur at different times. Accordingly, LATP thread managers may be thought of as acting autonomously for a cooperative shared goal of optimizing shared resource utilization (e.g., such that higher priority requests from other services may be processed by the shared resource in a timely manner).

In some embodiments, LATP may be usefully applied in the context of distributed computing platforms where the workload of the distributed computing platform may be divided into at least two groups that interact with the shared resource whose utilization it is desired to manage, where those two groups include a workload associated with batch requests that may be of a lower priority and a workload whose items have a higher priority. It is thus desired to manage the load placed on the shared resource (e.g., by the lower priority batch requests) to allow the shared resource to time process the higher priority workload items (e.g., to give priority to, or reserve enough overhead of the shared resource to timely process, the higher priority workload items).

Turning then to FIG. 1, a block diagram of an embodiment of a distributed computer environment 100 including a distributed computing platform 102. The distributed (e.g., comprising a set of services) computing platform 102 may, for example, provide some form of product or service accessible by users (e.g., human or machine) over a computing network such as the Internet or the like. The distributed computing platform comprises one or more (batch) services 104 devoted to processing the batch (e.g., background or lower priority) workload. This service 104 may utilize a shared resource 120. This shared resource 120 can be a shared resource deployed on, or provided by, a computing platform such as a (e.g., remote) cloud computing platform, or internal to distributed computing platform 102, or another type of resource available over the network. Thus, this shared resource 120 may be almost any kind of system, database or otherwise that may be accessed through an interface offered by the shared resource, including those shared resources 120 that may be constrained to one operating system instance or an I/O backplane, etc. For example, shared resource 120 may be a Single OS Instance" or "Single Write-Enabled Master Node" database technology, including for example Amazon RDS, NoSQL databases like Key/Value or other document stores. This shared resource 120 may accordingly be thought of as a finite resource (e.g., having a limited number of CPU cores, memory, socket connections, etc.)

The service 104 includes a thread pool comprising a set of worker threads 108 processes the batch workload of the computing platform 102 by obtaining a batch work item from a batch work item queue and providing the batch work item to a worker thread 108 of the thread pool 106. The worker thread 108 can then process the batch work item. During processing the batch work item the worker thread 108 may access the shared resource 120 by sending a request or other communication to the shared resource across computing network 130. In some cases, for example, a worker thread 108 may be given a connection (e.g., its own exclusive connection such a Java Database Connectivity (JDBC) connection to the shared resource 120).

Distributed computing platform 102 may also have one or more services 140 devoted to processing higher priority requests. These higher priority requests may be associated with an interactive user workload comprised of users requests (e.g., as received through an interface offered by the distributed computing platform 102). Specifically, users may interact with an interface provided by the computing platform 102 such as a web page or the like and requests for the distributed computing platform 102 may be generated from these user interactions. These user requests are usually distributed (e.g., through a load balancer or the like) to an appropriate service 140. During processing the user request the service 140 may access the shared resource 120 by sending a request or other communication to the shared resource across computing network 130. This interactive user workload tend to be queries supporting the presentation of the application's user interface. They tend to have more real-time requirements on responsiveness from the shared resource 120. In other words, when a request to the shared resource 120 takes a long time, a user must wait longer before information is displayed on their interface or browser. Moreover, the size of this interactive user workload is relatively unpredictable, as it depends heavily on the behavior of users, and many time users across different tenants of the distributed computing system 102.

The real-time and highly variable requirements of this user interactive workload can be contrasted with the batch workload. Batch tasks, which are usually not exposed directly to the end users, tend to be more tolerant of processing latency of delays in the shared resource 120. Thus, the batch workload may be more predictable and steady state. It can be noted however, that such tasks may also be exposed to failure in conditions of total overload of the shared resource 120. For example, while batch tasks may not be constrained by REST API or HTTP timeout limitations, they still have response time limits implemented at the interface or (e.g., TCP) socket layers.

Thus, to ensure that sufficient overhead capacity of shared resource 120 is available to service the higher priority requests originating from interactive user workload services 140 a control mechanism for regulating the workload placed on the shared resource 120 may be implemented in distributed computing platform 120. As it may be difficult to regulate or control the volume or timing of requests of the higher priority requests originating from interactive user workload service 140 (e.g., because of their real-time requirements), effective control mechanisms may be implemented in association with batch service 104.

Such a control mechanism may comprise a load attenuated thread pool (LATP) included in the batch service 104. This LATP includes the thread pool 106 comprising the worker threads 108 servicing the requests handled by the service 104 and thread pool manager 112 that can attenuate (herein used to mean add, remove or leave unchanged) the number of worker threads 108 (or the connections of those workers) in the thread pool 106 based on a resource utilization metric associated with the shared resource 120. The thread pool manager 112 aims to manage the amount of load placed on the shared resource 120 from the batch sources of workload, providing a reservation of a capacity or overhead of shared resource 120 to always be available for servicing the relatively unpredictable needs of the interactive users. Thus, it will be understood in this disclosure that the term "lower priority service" is utilized to mean a serve whose threads are managed by an embodiment of a thread pool manager while, conversely, the term "higher priority service" will be understood to mean a service whose threads or other methods of processing work items are not managed utilizing a LATP.

In particular, thread pool manager 112 may attenuate (herein used to mean add, remove or leave unchanged) the number of worker threads 108 in the thread pool 106 based on a resource utilization metric associated with the shared resource 120. In particular, at some time interval a resource utilization metric associated with the shared resource 120 may be obtained and evaluated using a thread policy by thread pool manager 112. This resource utilization metric may be an I/O metric, a network metric, a CPU utilization metric or the like that is offered by the provider of the shared resource 120 and accessible through an interface associated with the shared resource 120. This interface may for example be an operating system associated with a server or computing platform on which the shared resource 120 is implemented (e.g., a RDBMS' operating system) or a cloud platform provider's monitoring tools. For example, in the case of the Amazon's RDS, resource utilization metrics such as a CPU utilization metric, network I/O metrics or block Device I/O metrics may be accessed through Amazon Web Services' (AWS) CloudWatch interface. Depending on the results of the evaluation of the resource utilization metric, threads 108 may be added to the thread pool 106, threads 108 of the pool 106 may be removed (e.g., killed or made idle) or the number of threads 108 may be unchanged. For example, in many cases, where the shared resource 120 is a relational database system, each thread 108 may be given its own exclusive connection (e.g., a Java Database Connection (JDBC)) from a pool. These connections may be removed or terminated by removing the thread 108 or the connection. This may be done at the connector (e.g., the JDBC connector) layer, thus requiring no changes to the service applications or the computing platform on which the service is executing. In one embodiment, the LATP can be implemented as a Thread Pool controller that implements Java's ExecutorService interface. It will be noted that the same concept may apply to all pthreads compatible languages like Perl, Python, or C/C++ for example.

Specifically, in one embodiment thread pool manager 112 decides how to manage the number of active worker threads 108 in the thread pool 106 via a control loop, using the resource utilization metric associated with the shared resource 120. In controller engineering terminology the resource utilization metric (e.g., a CPU Utilization metric) is a Process Variable being controlled. The control loop obtains the resource utilization metric (e.g., a CPU Utilization metric), compares it to a given policy for the service, and then determines what, if any, action should be taken. Embodiments of LATP may operate according to a principle that work can be added to service while the resource utilization metric (or combination of resource utilization metrics such as CPU utilization, block device I/O capacity, or network I/O capacity) remain in a "capacity available" state. As long as batch work to be done remains present in a queue of batch work items, the number of worker threads in the thread pool that are processing the batch workload, (e.g., and thus open connections to the shared resource such as a database system), can be slowly increased. In many cases, it is desirable that workload (e.g., new threads) should be added slowly, with small increments in additional concurrency, so that the additional workload may be added gradually and the additional workload's impact on the shared resource (e.g., as determined from the resource utilization metric such as the CPU utilization) measured appropriately.

Figure 2:
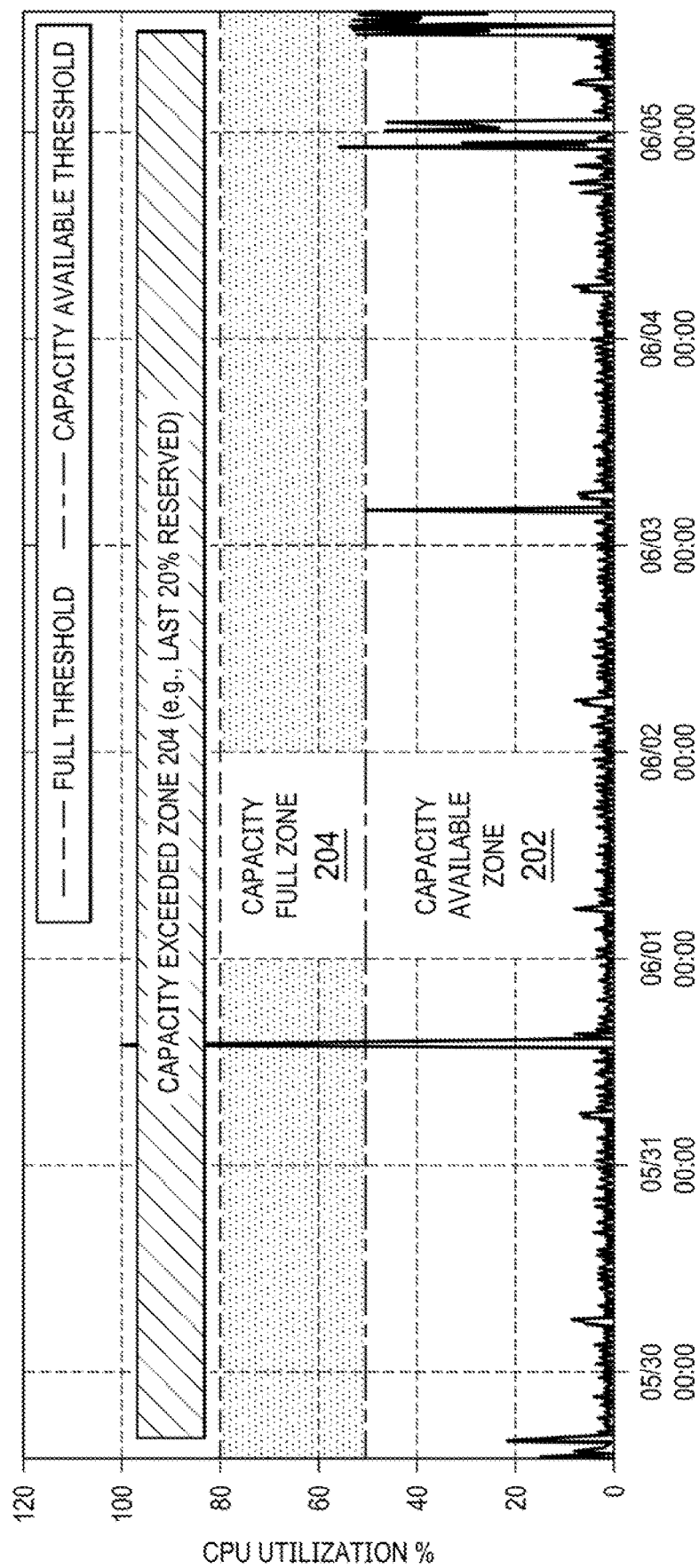
FIG. 2 is a depiction of example capacity zones.

Embodiments of the LATP may be thought of applying a policy that divides the resource utilization metric CPU utilization into three regions or areas that are demarcated by resource utilization thresholds. FIG. 2 depicts a graphical example of such a division, again, taking CPU utilization as an example resource utilization metric and a database system as an example shared resource. As depicted a "low" utilization region 202 may be defined by a resource utilization metric that falls below a certain capacity available threshold (e.g., specified by a policy) where there is sufficient CPU headroom for more background or batch load to be added to the shared resource. This is the "capacity available" region where it may be desirable to add more threads to the thread pool of a batch service. In the depicted example, a "medium" region 204 may be defined by a resource utilization metric that falls below a full threshold (e.g., specified by a policy) and above the capacity available threshold, where there is sufficient load on the shared resource that it may not be desirable to increase the load on the shared resource. This is the "capacity full" region. Once the system reaches a CPU utilization in the "full" state no more concurrency or load should be added to the shared resource. The number of worker threads may thus remain fixed, and this is considered a "steady state". Some capacity of the shared resource is used for background work, while some capacity of the shared resource remains in reservation for the high priority requests. (e.g., user interface originated requests). A "high" region 206 that indicates that the shared resource is overloaded, and steps should be taken to reduce load against the shared resource. This is the "capacity exceeded" region. This may also be thought of as the overhead or capacity that it is desired to reserve for high priority (e.g., user interface) requests on the shared resource. If the resource utilization metric falls into this region, the policy may define how the LATP should reduce the amount of load on the shared resource to free up resources for other demands. This may entail a reduction of the number of threads comprising the thread pool of the LATP.

It will be noted that the various threshold values and numbers and resource utilization metric (e.g., CPU utilization) are given by way of examples. Other resource utilization metrics and thresholds may be utilized in different policies and are fully contemplated herein. For example, similar regions and thresholds may be defined for existing Network I/O saturation and block device I/O saturation. The threshold may also not be strictly percentages; different cloud infrastructures may have different "upper limits" on these metrics. For example, different thresholds may be applied to reads and writes per second and raw data bytes read and written per second. The specific numbers and thresholds used for shared resources may also vary significantly with the type of backing infrastructure (e.g., AWS RDS Instance Size) in use, as well as with the type of storage allocated to the shared resource, for example.

As may be noted, in distributed computing environments, there may be one or more services that may be utilized to process lower priority (e.g., batch) work item. Thus, in embodiments, there is not one single LATP inside a single software process, instead there are multiple LATPs, each LATP included in a service instance (e.g., a microservice instance) that are all simultaneously processing work from the same queue of pending batch work items and all interacting with the same scarce shared resource (e.g., relational database). The service instances are usually distributed across multiple physical computing facilities (e.g., they may be in different Availability Zones).

Figure 3:
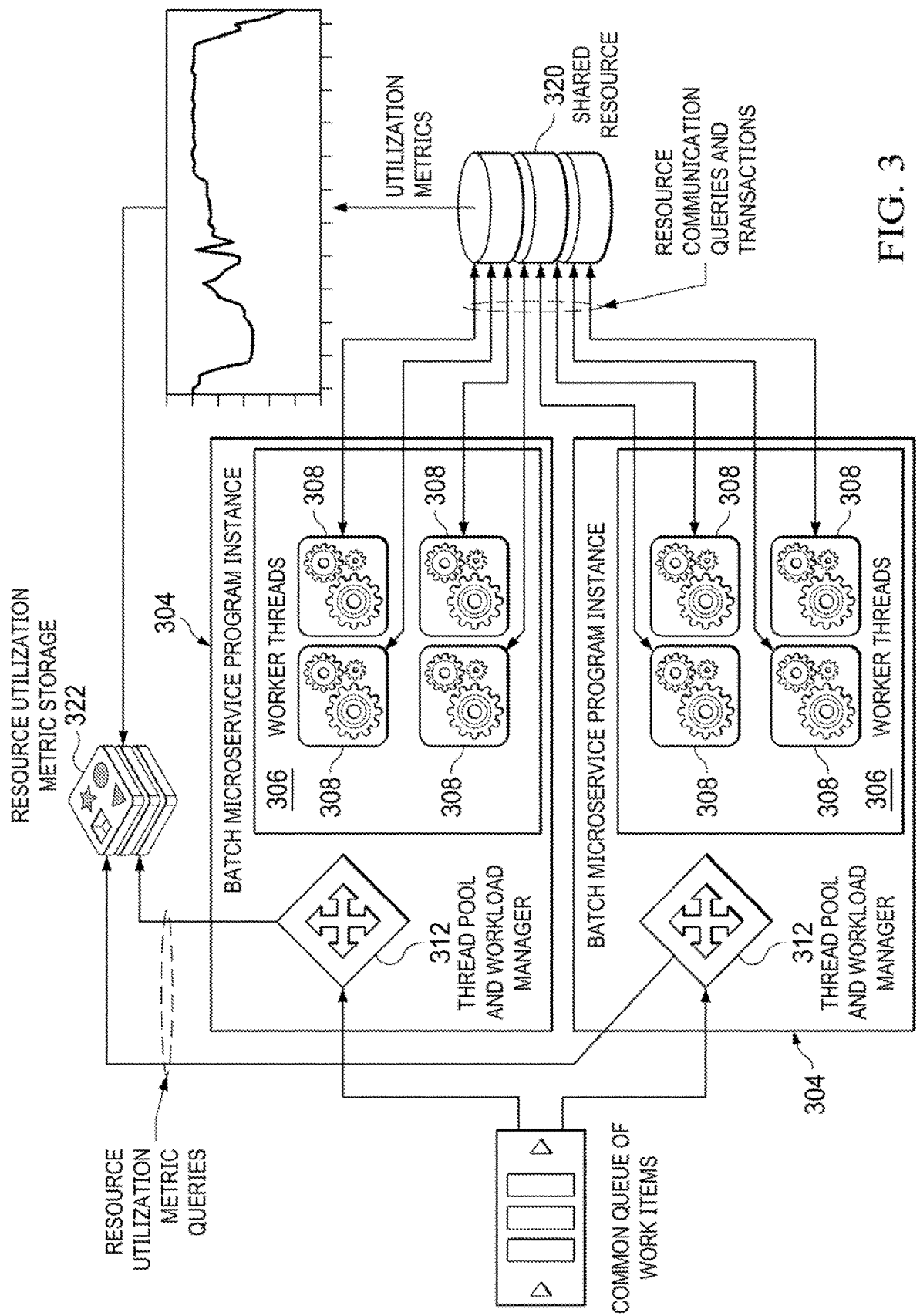
FIG. 3 is a block diagram of a distributed networked computer environment including one embodiment of a load attenuated thread pool.

FIG. 3 is a block diagram depicting one embodiment of LATP deployment in a service architecture in a distributed computing environment such as a SaaS multi-tenant environment. Here, batch services 304 are devoted to processing the batch (e.g., background or lower priority) workload. These services 304 may all utilize shared resource 320. This shared resource 320 can be a shared resource deployed on, or provided by, a cloud platform or internal to the distributed computing platform or another type of resource available over the network. Thus, this shared resource 320 may be almost any kind of system, database or otherwise that may be accessed through an interface offered by the shared resource 320, including for example a relational database system. This shared resource 320 may accordingly be thought of as a finite resource (e.g., having a limited number of CPU cores, memory, socket connections, etc.).

Each service 304 includes a LATP including a thread pool 306 comprising a set of worker threads 308 servicing batch requests from a queue of batch work items, and thread pool manager 312 that can attenuate the number of worker threads 308 in the thread pool 306 based on a resource utilization metric associated with the shared resource 320. The thread pool manager 312 aims to manage the amount of load placed on the shared resource 320 from the batch sources of workload, providing a reservation of a capacity or overhead of shared resource 320 to always be available for servicing the relatively unpredictable needs of the interactive users.

In particular, at some time interval a resource utilization metric (e.g., CPU utilization) associated with the shared resource 320 may be obtained from the shared resource 320 and stored in a resource utilization metric storage location 322 such as a cache (e.g., a Redis database within the distributed computing environment). For example, the distributed computing environment may have an updater that calls or otherwise accesses the interface of the shared resource 320 at some interval to request or obtain the resource utilization metric and stores the resource utilization metric in the resource utilization metric storage location 322. This interface of the shared resource 320 may for example be an operating system associated with a server or computing platform on which the shared resource 120 is implemented (e.g., a RDBMS' operating system) or a cloud platform provider's monitoring tools. For example, in the case of the Amazon's RDS, resource utilization metrics such as a CPU utilization metric, network I/O metrics or block Device I/O metrics may be accessed through AWS Cloud-Watch interface. Thus, in some embodiments, the thread pool managers 312 across each instance of the services 304 may share a resource utilization metric (e.g., feedback loop data source) stored in storage location 322.

Accordingly, at some interval each thread pool manager 312 of each LATP in each service 304 may (e.g., interpedently) obtain the resource metric from the resource utilization metric storage location 322 and evaluate the obtained resource utilization metric using a thread policy. Depending on the results of the evaluation of the resource utilization metric, threads 308 may be added to the thread pool 306, threads 308 of the pool 306 may be removed (e.g., killed or made idle) or the number of threads 308 may be unchanged.

It may be noted here, that according to certain embodiments, while each thread pool manager 312 may receive the same resource utilization data, their decisions may not be synchronous, nor are the thread pool managers 312 communicating among themselves in any way. The utilization metrics from the resource utilization metric storage location 322 are a "one way" stream of data to each of the thread pool managers 312. This architecture provides a unique advantage because it does not require integration with auto-scaling systems, infrastructure systems like K8S or Terraform, or runtime monitoring systems. Moreover, the autonomy of the thread pool managers 312 allows superior flexibility in deployment.

To illustrate, as LATP thread managers 312 in each service 304 may be adapted not to operate in synchronicity (e.g., accessing the resource utilization metric or making attenuation determinations at the same time or operating according to the same time interval, etc.) the thread adjustments for the thread pool 306 for each service 304 may be distributed across the time interval or intervals utilized by such LATP thread managers 312 and may occur at different times. Accordingly, LATP thread managers 312 may be thought of as acting autonomously for a cooperative shared goal of optimizing shared resource utilization (e.g., such that higher priority requests from other services may be processed by the shared resource in a timely manner).

Figure 4:
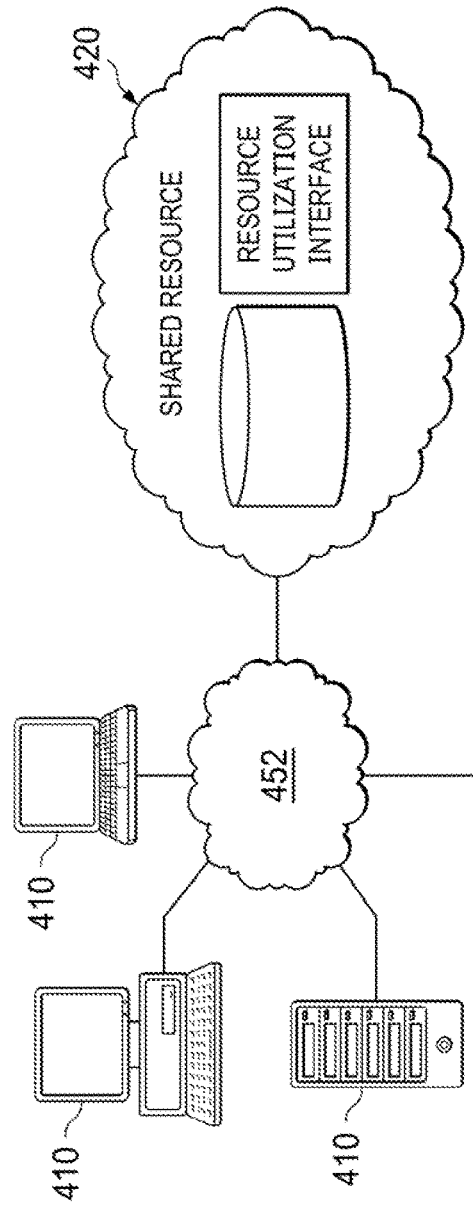
FIG. 4 is a block diagram of a distributed networked computer environment including one embodiment of a load attenuated thread pool.
Figure 4:
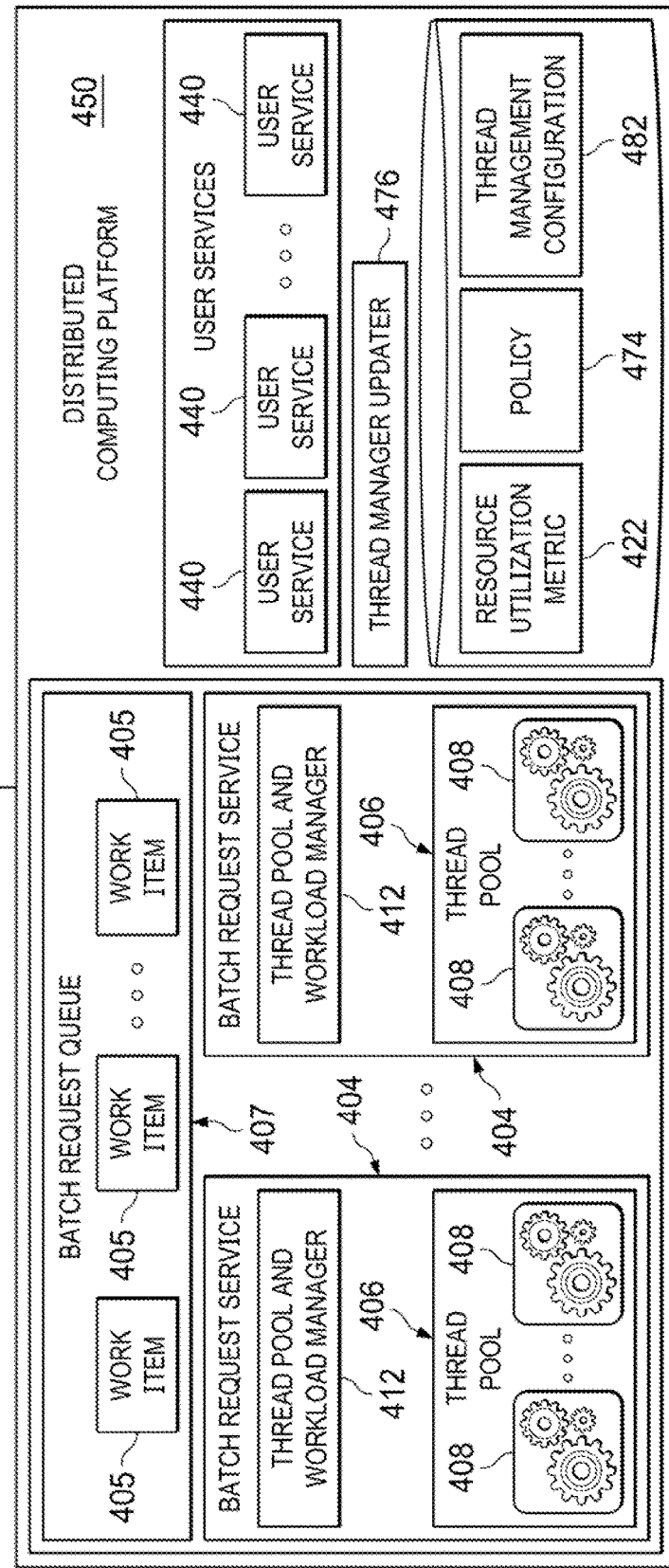

Referring to FIG. 4 now, a distributed computing environment including one embodiment of a distributed computing platform 450 utilizing load attenuating thread pools is depicted. The distributed (e.g., comprising a set of services) computing platform 450 may, for example, provide some form of product or service accessible by users (e.g., human or machine) over a computing network such as the Internet or the like. Such distributed computing platforms may include, for example platforms such as SailPoint's IdentityNow or IdentityIQ identity management platforms. As another example, a computing platform 450 may be a banking platform implementing a banking application whereby batch transactions between banks may be carried out to do ledger reconciliations while also supporting customer facing websites and bank interactions with users.

The distributed computing platform comprises one or more (batch) services 404 devoted to processing the lower priority batch (e.g., background or other lower priority) workload comprised of batch work items 405 in a batch request queue 407. Such batch work items 405 may include requests or other work items associated with the collection or transformation of data such as extract, transform and load (ETL) processing from source systems or the like. For example, in the identity management context such background work items 407 may be related to the collection and uploading of identity management data from one or more source systems within one or more enterprises such as described, for example, in U.S. patent application Ser. No. 16/791,047, filed Feb. 14, 2020 by Lees et al, entitled "Systems and Methods for Searching in Identity Management Artificial Intelligence Systems" and U.S. patent application Ser. No. 16/749,577, filed Jan. 22, 2020 by Anderson et al, entitled "Systems and Methods for Tagging in Identity Management Artificial Intelligence Systems and Uses for Same, Including Context Based Governance" both of which are incorporated herein by reference in their entirety.

Each of these batch services 404 may utilize a shared resource 420. This shared resource 420 can be a shared resource deployed on, or provided by, a cloud platform or internal to distributed computing platform 450 or another type of resource available over network 452. Thus, this shared resource 420 may be almost any kind of system, database or otherwise that may be accessed through shared resource interface 422 offered by the shared resource 420. For example, shared resource 420 may be a relational database system, including for example Amazon RDS. The shared resource 420 may be associated with a resource utilization interface 442 through which resource utilization metrics associated with the distributed computing platforms use of the shared resource 420. One example of such a resource utilization interface is AWS' CloudWatch interface. Continuing with the example of an identity management computing platform, the batch service 404 may access the shared resource 420 to store or otherwise access or manipulate identity management data associated with enterprises utilizing the distributed computing platform 450.

Accordingly, each batch service 404 includes a thread pool 406 comprising a set of worker threads 408 to processes the batch workload of the computing platform 450 by obtaining a batch work item 405 from batch work item queue 407 and providing the batch work item 407 to a worker thread 408 of the thread pool 406. The worker thread 408 can then process the batch work item 405. During processing the batch work item the worker thread 408 may access the shared resource 420 by sending a request or other communication to the shared resource 420 across computing network 452.

Distributed computing platform 450 may also have one or more services 440 devoted to processing higher priority requests. These higher priority requests may be associated with an interactive user workload comprised of users requests (e.g., as received through a user interface offered by the distributed computing platform 450). Specifically, users may interact with an interface provided by the computing platform 450 at their user devices 410 such as a web page or the like and requests for the distributed computing platform 450 may be generated from these user interactions. These user requests are usually distributed (e.g., through a load balancer or the like) to an appropriate service 440. During processing the user request the service 440 may access the shared resource 420 by sending a request or other communication to the shared resource across computing network 452. This interactive user workload tend to be queries supporting the presentation of the computing platform's user interface. They tend to have more real-time requirements on responsiveness from the shared resource 420. In other words, when a request to the shared resource 420 takes a long time, a user must wait longer before information is displayed on their interface or browser at the user's device 410.

Thus, to ensure that sufficient overhead capacity of shared resource 420 is available to service the higher priority requests originating from interactive user workload services 440 a control mechanism for regulating the workload placed on the shared resource 420 may be implemented in distributed computing platform 450. As it may be difficult to regulate or control the volume or timing of requests of the higher priority requests originating from interactive user workload service 440 (e.g., because of their real-time requirements), effective control mechanisms may be implemented in association with batch services 404.

Such a control mechanism may comprise a load attenuated thread pool (LATP) included in each (or a subset of) batch service 404. Each instance of the LATP within a batch service 404 includes the thread pool 406 comprising the worker threads 408 of that service 404 and thread pool manager 412 that can attenuate (herein used to mean add, remove or leave unchanged) the number of worker threads 408 (or the connections of those workers) in the thread pool 406 based on a resource utilization metric associated with the shared resource 420. The thread pool manager 412 may be adapted to independently (e.g., without communication with the other thread pool managers 412 of the other batch services 404) manage the amount of load placed on the shared resource 420 from the batch sources of workload, providing a reservation of a capacity or overhead of shared resource 420 to always be available for servicing the relatively unpredictable needs of the interactive users.

Thus, when batch service 404 is spawned or otherwise starts in distributed computing platform 450, the thread pool manager 412 may read a thread management configuration 482 stored within the distributed computing platform 450. Such a configuration 482 may indicate, for example, if dynamic thread control is enabled or disabled. This configuration 482 may also be checked at some time interval by each batch service 404. In this manner, all LATPs within each batch service 404 may be controlled from a central "switch" to turn off or on thread management by the LATPs. As noted, in one embodiment, each LATP may be based on Java ExecutorService such that if the thread management is turned off using configuration 482 the LATP may function as a typical Java ExecutorService thread pool.

The thread pool manager 412 may also determine a policy 474 associated with the associated service 404 to configure itself. For example, a thread pool manager 412 may send a request for a policy 474 (e.g., with one or more criteria or identifiers) and an appropriate policy may be returned to the thread pool manager 412. Alternatively, the thread pool manager may access an appropriate policy 474 (e.g., based on one or more criteria or identifiers). It will be noted that there may be different policies 474 for different types of batch service 404 or the policy to utilize may be selected of vary based on other criteria such as the time of day. In this manner the thread attenuation policy may be changed or altered based on particular criteria such as the time of day or the like. This capability may allow the dual advantages of LATP and also time based scheduling to be simultaneously achieved.

There are several parameters that can be configured for a given policy, and different instances of an LATP instance (e.g., different thread pool managers 412 and associated thread pools 406) in different services 404 may have different policies in effect to manage their specific queues of work items. Policy parameters may include, for example: initial worker thread count (e.g., with default: 1); minimum worker thread count (e.g., with default: 1); maximum worker threads allowed (e.g., default: 16); step up threads per time interval (cycle) (e.g., default: 1); back-off ratio (e.g., default 0.5); full zone threshold (e.g., default: 50% in the case where the resource utilization metric is CPU utilization); or (capacity) exceeded zone threshold (e.g., default: 75% in the case where the resource utilization metric is CPU utilization).

The initial worker count specifies how many worker threads are started initially, (e.g., before any resource utilization metric such as CPU utilization) has been received by the thread pool managers 412. The minimum worker thread count is a floor; the thread pool managers 412 may not allow the number of worker threads 408 to go below this number. Even if the resource metric (CPU utilization) indicates a complete saturation or overloaded state this number of worker threads 408 will be allowed to process work. The maximum worker threads allowed is a ceiling. Regardless of whether additional resource overhead (e.g., CPU cycles) are available this may be the largest number of worker threads 408 that will be concurrently instantiated. The step-up threads per time interval (cycle) is the number of threads 408 that will be added to the pool 406. It may be desired to keep this number conservatively small in certain embodiments. The back-off ratio is what percentage of threads 408 are removed from thread pool 406 when the resource utilization metric (e.g., CPU utilization) is higher than the exceeded zone or capacity full threshold (e.g., a percentage). In some embodiment, it may be the case that always at least one worker thread 408 is removed, but a policy 474 can indicate more than one thread 408 should be removed. It will be noted that more aggressive back-off policies return cycles to the higher priority work items more quickly. The full threshold (e.g., a percentage) is the threshold above which the thread pool manager 412 will apply a steady-state policy of not adding any more worker threads 408 to the pool 406. The capacity exceeded threshold is the threshold (e.g., of the resource utilization metric such as CPU utilization) above which the thread pool manager 412 begins removing worker threads 408 from the thread pool 406.

During operation then, thread pool manager 412 can attenuate (e.g., add, remove or leave unchanged) the number of worker threads 408 in the thread pool 406 based on a resource utilization metric associated with the shared resource 420. This resource utilization may be a utilization metric associated with a total load placed on an aspect of the shared resource 420 such as a hardware or network utilization metric associated with a total load placed on the shared resource 420. In this manner, the thread pool manager 412 independently manages the number of worker threads 408 of the thread pool 406 of only that service 404 based on a resource utilization metric associated with a total load placed on (e.g., the hardware or network resources of) the shared resource 420.

In one embodiment, at some time interval (e.g., cycle) the resource utilization metric associated with the shared resource 420 may be obtained by the distributed computing platform 450 from the shared resource 420 and stored in a resource utilization metric storage location 422 such as a cache (e.g., a Redis database within the distributed computing platform 450). For example, the distributed computing platform 450 may have a thread manager updater 476 that calls or otherwise accesses resource utilization interface 442 of the shared resource 420 at some interval to request or obtain the resource utilization metric and stores the resource utilization metric in the resource utilization metric storage location 422. This interface of the shared resource 420 may for example be an operating system associated with a server or computing platform on which the shared resource 120 is implemented (e.g., a RDBMS' operating system) or a cloud platform provider's monitoring tools. For example, in the case of the Amazon's RDS, resource utilization metrics such as a CPU utilization metric, network I/O metrics or block device I/O metrics may be accessed through AWS CloudWatch interface. It will be noted that a resource utilization metric may comprise multiple values of different utilization metrics or a combination, score or weighting derived from the combination of multiple utilization metrics without loss of generality.

While the value for the resource utilization metric may be based on, or include, metrics or data obtained from the shared resource 420 or providers of the shared resource 420 it will also be noted that the value for the resource utilization metric may also be determined based on data determined at the distributed computing platform 450. Such data may include data determined from utilization metrics associated with, and determined on, distributed computing platform, including for example queue depths associated with the batch services 404 or user services 440 or utilization metrics for interface services or server platforms or other data. As another example, an automated browser or automated browser tool may be used to submit requests to the user services 440 and determine a value for a service level metric. This service level metric may be utilized in the determination of a resource utilization metric. The use of such data in determining a resource utilization metric may allow thread management of the threads of an LATP to be based on resource utilization metrics associated with the shared resource 420, data of the distributed computing platform, or a combination of data pertaining to the distributed computing platform and the shared resource 420.

Accordingly, at some interval each thread pool manager 412 of each LATP in each service 404 may (e.g., independently) obtain the resource metric from the resource utilization metric storage location 422 (or be notified when the resource utilization metric has changed from a last update) and evaluate the obtained resource utilization metric using the policy 474 (e.g., a thread attenuation policy) by which the service was configured. In one embodiment, the thread pool manager 412 may delay until resource utilization metric 422 has been updated.

When the resource utilization metric has been updated, the thread pool manager 412 can determine if dynamic thread control is enabled (e.g., is the thread pool manager configured for dynamic thread control according to the thread management configuration 482 by which the LATP was configured). If dynamic thread control has not been enabled, the thread pool manager 412 can wait until the resource utilization metric is again updated and check again (if dynamic thread management has been updated in the interim).

If however, dynamic thread management is enabled, the availability of the shared resource can be determined. Specifically, the current value of the resource utilization metric can be compared to one or more parameters of the policy 474 by which the LATP was configured to determine if there is capacity of the shared resource available (e.g., is the resource utilization metric below the capacity available threshold). If thread pool manager 412 determines that capacity of the shared resource 420 is available (e.g., the resource utilization metric 422 is in the capacity available zone), the thread pool manager 412 can then determine if there are currently a maximum number (e.g., as define by the policy 474) of threads 408 in the thread pool 406. If there are currently a maximum number of threads 408 in the thread pool 406 no action may be taken and the thread pool manager 412 may once again delay until a new value for the resource utilization metric for the shared resource 420 once again become available. If there are not currently a maximum number of threads 408 in the thread pool 406, one or more threads 408 may be added to the thread pool 406. The number of threads to add (e.g., the thread addition number) may be defined as a parameter of the policy 474 used to configure the LATP (e.g., the step up threads per time interval).

If it is determined that there is no capacity available when the current value of the resource utilization metric is evaluated against the parameters of the policy, it can be determined whether utilization of the shared resource 420 is in the capacity full zone or the capacity exceeded zone. Here, thread pool manager 412 can compare the value of the current value of the resource utilization metric to a parameter of the policy 474 by which the LATP was configured to determine if the capacity of the shared resource is full or exceed (e.g., is the resource utilization metric below, or above, the capacity full threshold). If the thread pool manager 412 determines that the utilization of the shared resource 420 falls into the capacity full zone (e.g., the resource utilization metric is below the capacity full threshold defined in the policy 474) the thread pool manager 412 may leave the number of threads unchanged and the thread pool manager 412 may once again delay until a new value for the resource utilization metric for the shared resource 420 once again become available. If, however, the thread pool manager 412 determines that the utilization of the shared resource 420 falls into the capacity exceeded zone (e.g., the resource utilization metric is above the capacity full threshold defined in the policy 474) the thread pool manager 412 may remove one or more worker threads 408 from the thread pool 406. Specifically, in one embodiment, the thread pool manager 412 may determine a number of threads 408 to remove by applying the back-off ratio defined in the policy to the existing number of threads 408 executing or the maximum number of threads as defined in the policy 474 to determine a number of threads 408 to remove. Once the number of threads 408 to remove is determined, this number of threads can be terminated and (e.g., after the threads 408 have cleanly terminated) be removed from the thread pool 406. The thread pool manager can then delay until a new value for the resource utilization metric for the shared resource once again become available.

Figure 5:
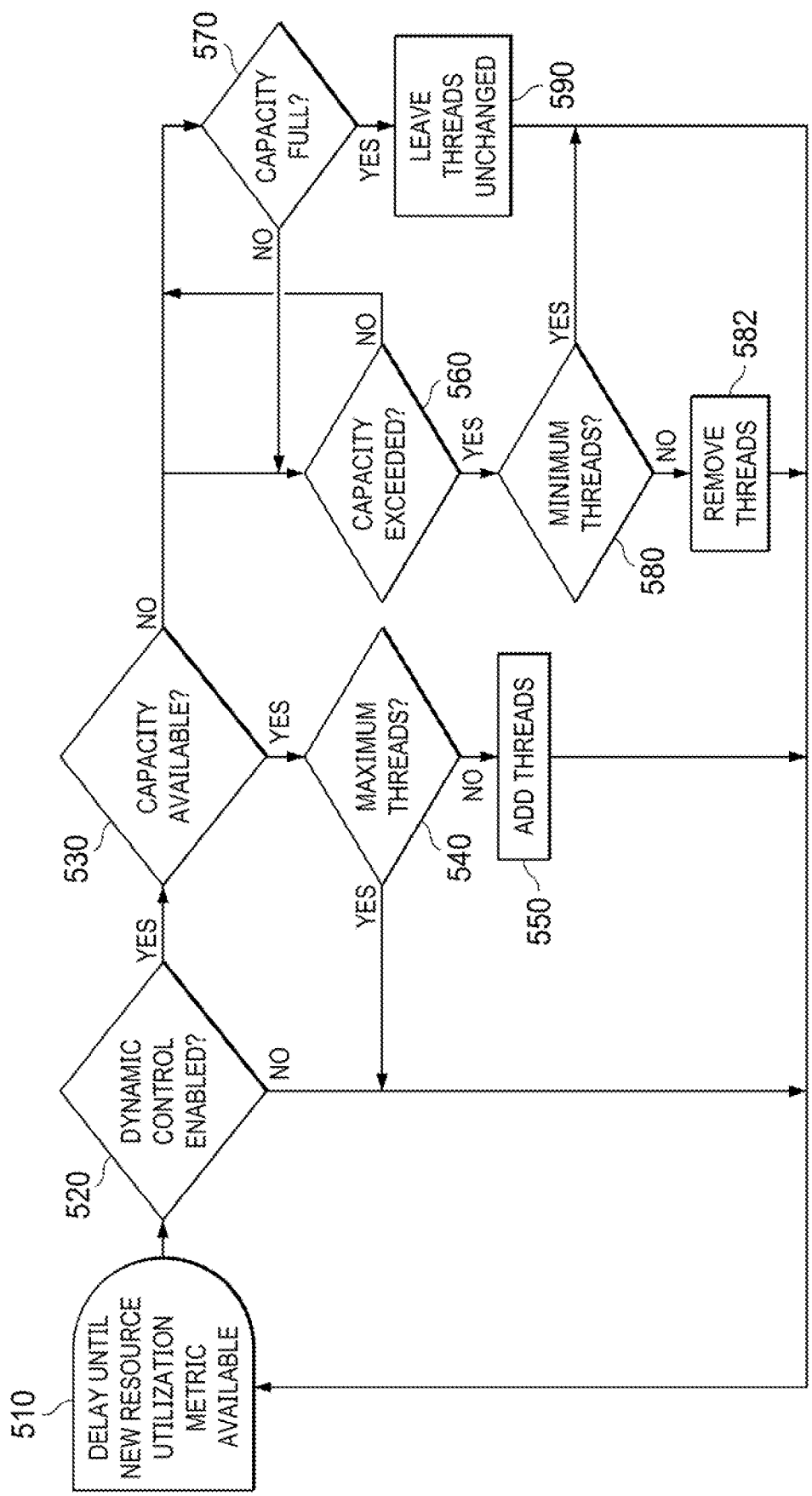
FIG. 5 is a flow diagram of one embodiment of a method for attenuating threads in a load attenuated thread pool.

FIG. 5 is flow diagram depicting one embodiment of a method that may be implemented by an instance of a LATP to attenuate threads of that LATP. Here, thread pool manager may delay until a resource utilization metric has been updated (STEP 510). When the resource utilization metric has been updated, the thread pool manager can determine if dynamic thread control is enabled (e.g., is the thread pool manager configured for dynamic thread control according to the thread management configuration by which the LATP was configured) (STEP 520). If dynamic thread control has not been enabled (N branch of STEP 520), the thread pool manager can wait until the resource utilization metric is again updated and check again (if dynamic thread management has been updated in the interim). If however, dynamic thread management is enabled (Y branch of STEP 520), the availability of the shared resource can be determined (STEP 530).

In one embodiment, the current value of the resource utilization metric can be compared to one or more parameters of the policy by which the LATP was configured to determine if there is capacity of the shared resource available (e.g., is the resource utilization metric below the capacity available threshold). If the thread pool manager determines that capacity of the shared resource is available (e.g., the resource utilization metric is in the capacity available zone) (Y branch of STEP 530), the thread pool manager can then determine if there are currently a maximum number (e.g., as define by a policy) of threads in the thread pool of the LATP (STEP 540). If there are currently a maximum number of threads in the thread pool (Y branch of STEP 540) no action may be taken and the thread pool manager may once again delay until a new value for the resource utilization metric for the shared resource once again become available. If there are not currently a maximum number of threads in the thread pool (N branch of STEP 540), one or more threads may be added to the thread pool (STEP 550). The number of threads to add may be defined as a parameter of the policy used to configure the LATP (e.g., the step up threads per time interval).

If it is determined that there is no capacity available when the current value of the resource utilization metric is evaluated against the parameters of the policy (N branch of STEP 530), it can be determined whether utilization of the shared resource is in the capacity full zone (STEP 570) or the capacity exceeded zone (STEP 560). Here, thread pool manager can compare the value of the current value of the resource utilization metric to a parameter of the policy by which the LATP was configured to determine if the capacity of the shared resource is full or exceed (e.g., is the resource utilization metric below, or above, the capacity full threshold). If the thread pool manager determines that the utilization of the shared resource falls into the capacity full zone (e.g., the resource utilization metric is below the capacity full threshold defined in the policy) (Y branch of STEP 570) the thread pool manager may leave the number of threads unchanged (STEP 590) and the thread pool manager may once again delay until a new value for the resource utilization metric for the shared resource once again become available.

If, however, the thread pool manager determines that the utilization of the shared resource falls into the capacity exceeded zone (e.g., the resource utilization metric is above the capacity full threshold defined in the policy) (Y branch of STEP 560) the thread pool manager may remove one or more worker threads from the thread pool of the LATP. Specifically, in one embodiment, it can be determined if the existing number of worker threads is at a minimum (e.g., the number if existing threads is at a minimum worker thread count) (STEP 580). If the existing number of worker threads is at the minimum number (Y branch of STEP 580) the thread pool manager may once again delay until a new value for the resource utilization metric for the shared resource once again become available.

If however, the existing number of worker threads exceeds the minimum number (N branch of STEP 580) the thread pool manager may remove one or more threads from the thread pool (STEP 582). Here, the thread pool manager determine a number of threads to remove (a removal thread number). The removal thread number may be determined, for example, by applying the back-off ratio defined in a policy to the existing number of threads executing or the maximum number of threads as defined in the policy to determine a number of threads to remove. Once the number of threads to remove is determined, this number of threads can be terminated and (e.g., after the threads have cleanly terminated) be removed from the thread pool. The thread pool manager can then delay until a new value for the resource utilization metric for the shared resource once again become available.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. The term "set" as used herein means one or more.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A system, comprising:
   a processor;
   a non-transitory, computer-readable storage medium, including computer instructions for:
   a thread pool manager adapted for use with a service, the thread pool manager adapted for use in an environment including a set of lower priority services having access to a shared resource and a set of higher priority services having access to the shared resource, wherein:
   the thread pool manager is adapted for use in a load attenuated thread pool of a lower priority service comprising, wherein the load attenuated thread pool includes a set of threads having access to the shared resource;
   each higher priority service has access to the shared resource to process work items, and the thread pool manager is adapted to independently:
   determine a resource utilization metric associated with the shared resource;
   evaluate the resource utilization metric associated with the shared resource against one or more thresholds; and
   based on the evaluation of the resource metric:
   determine a removal thread number and remove that removal thread number of threads from an existing number of the set of threads of the thread pool,
   determine a thread addition number and adding that thread addition number of threads to the existing number of the set of threads of the thread pool, or
   leave the set of threads unchanged.

2. The system of claim 1, wherein evaluating the resource metric comprises determining if the resource utilization metric falls into a capacity exceeded zone, a capacity full zone or a capacity available zone.

3. The system of claim 1, wherein the resource utilization metric is obtained from a remote computing platform.

4. The system of claim 1, wherein the set of lower priority services and the set of higher priority services are deployed on a cloud computing platform.

5. The system of claim 1, wherein the resource utilization metric comprises a network utilization metric associated access to the shred resource or a hard utilization metric associated with a computing platform of the shared resource.

6. The system of claim 1, wherein the thread pool manager accesses a centralized thread management configuration to determine a policy including the one or more thresholds, the removal thread number or thread addition number.

7. The system of claim 6, wherein the policy is specific to a type of thread.

8. A method for thread management, comprising:
   providing a thread pool manager adapted for use with a service, the thread pool manager adapted for use in an environment including a set of lower priority services having access to a shared resource and a set of higher priority services having access to the shared resource, wherein:
   the thread pool manager is adapted for use in a load attenuated thread pool of a lower priority service comprising, wherein the load attenuated thread pool includes a set of threads having access to the shared resource;
   each higher priority service has access to the shared resource to process work items, and the thread pool manager is adapted to independently:
   determine a resource utilization metric associated with the shared resource;
   evaluate the resource utilization metric associated with the shared resource against one or more thresholds; and
   based on the evaluation of the resource metric:
   determine a removal thread number and remove that removal thread number of threads from an existing number of the set of threads of the thread pool,
   determine a thread addition number and adding that thread addition number of threads to the existing number of the set of threads of the thread pool, or
   leave the set of threads unchanged.

9. The method of claim 8, wherein evaluating the resource metric comprises determining if the resource utilization metric falls into a capacity exceeded zone, a capacity full zone or a capacity available zone.

10. The method of claim 8, wherein the resource utilization metric is obtained from a remote computing platform.

11. The method of claim 8, wherein the set of lower priority services and the set of higher priority services are deployed on a cloud computing platform.

12. The method of claim 8, wherein the resource utilization metric comprises a network utilization metric associated access to the shred resource or a hard utilization metric associated with a computing platform of the shared resource.

13. The method of claim 8, wherein the thread pool manager accesses a centralized thread management configuration to determine a policy including the one or more thresholds, the removal thread number or thread addition number.

14. The method of claim 13, wherein the policy is specific to a type of thread.

15. A non-transitory computer readable medium, comprising instructions for:
   providing a thread pool manager adapted for use with a service, the thread pool manager adapted for use in an environment including a set of lower priority services having access to a shared resource and a set of higher priority services having access to the shared resource, wherein:

the thread pool manager is adapted for use in a load attenuated thread pool of a lower priority service comprising, wherein the load attenuated thread pool includes a set of threads having access to the shared resource;

each higher priority service has access to the shared resource to process work items, and the thread pool manager is adapted to independently:

determine a resource utilization metric associated with the shared resource;

evaluate the resource utilization metric associated with the shared resource against one or more thresholds; and based on the evaluation of the resource metric:

determine a removal thread number and remove that removal thread number of threads from an existing number of the set of threads of the thread pool, determine a thread addition number and adding that thread addition number of threads to the existing number of the set of threads of the thread pool, or leave the set of threads unchanged.

16. The non-transitory computer readable medium of claim 15, wherein evaluating the resource metric comprises determining if the resource utilization metric falls into a capacity exceeded zone, a capacity full zone or a capacity available zone.

17. The non-transitory computer readable medium of claim 15, wherein the resource utilization metric is obtained from a remote computing platform.

18. The non-transitory computer readable medium of claim 15, wherein the set of lower priority services and the set of higher priority services are deployed on a cloud computing platform.

19. The non-transitory computer readable medium of claim 15, wherein the resource utilization metric comprises a network utilization metric associated access to the shred resource or a hard utilization metric associated with a computing platform of the shared resource.

20. The non-transitory computer readable medium of claim 15, wherein the thread pool manager accesses a centralized thread management configuration to determine a policy including the one or more thresholds, the removal thread number or thread addition number.

21. The non-transitory computer readable medium of claim 20, wherein the policy is specific to a type of thread.

* * * * *